April 24, 1956
A. OLLER
2,742,799
CIRCULAR SAW GRINDING FIXTURE
Filed Jan. 28, 1955
3 Sheets-Sheet 1
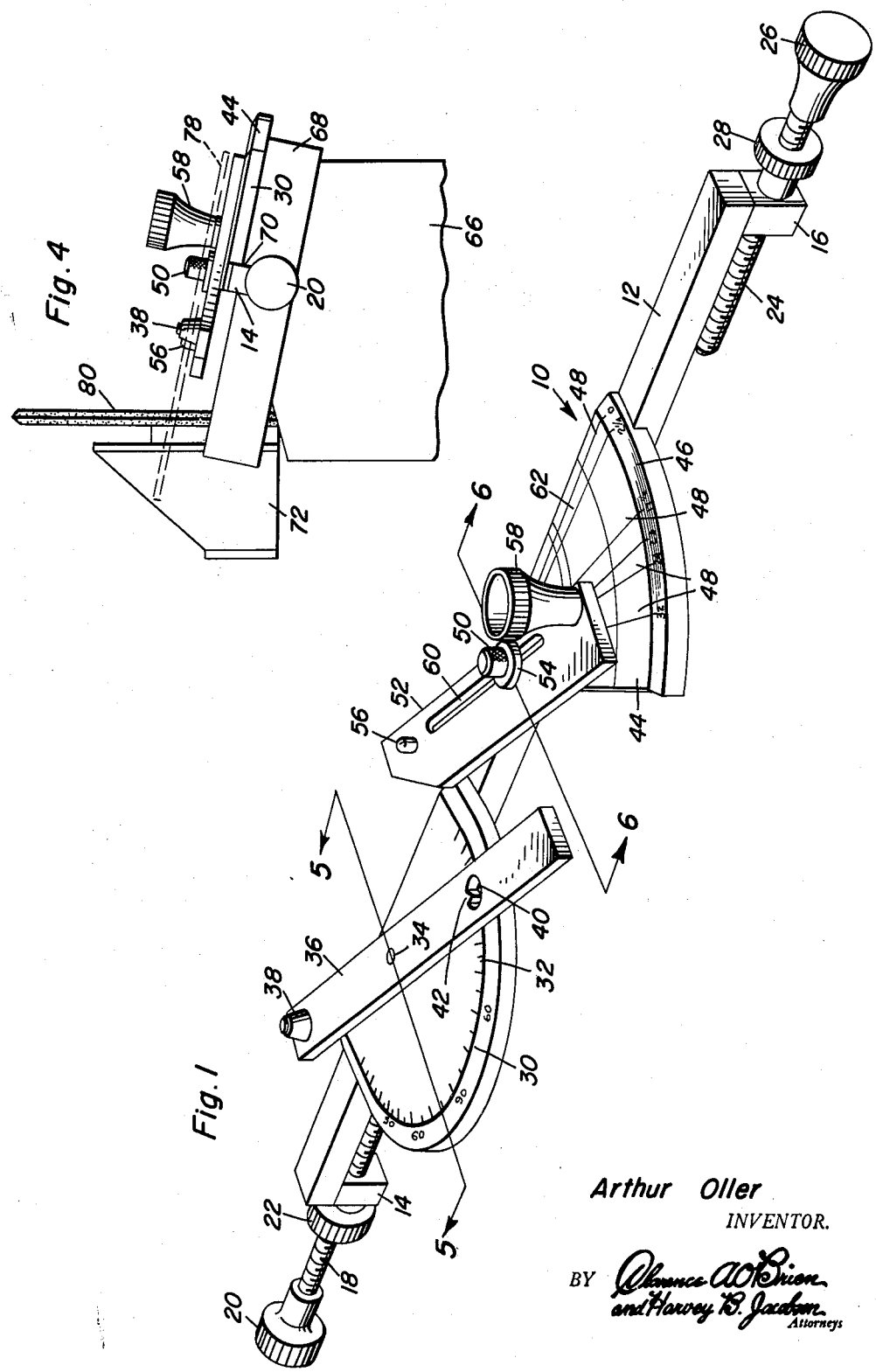
Arthur Oller
INVENTOR.

April 24, 1956 A. OLLER 2,742,799
CIRCULAR SAW GRINDING FIXTURE
Filed Jan. 28, 1955 3 Sheets-Sheet 2
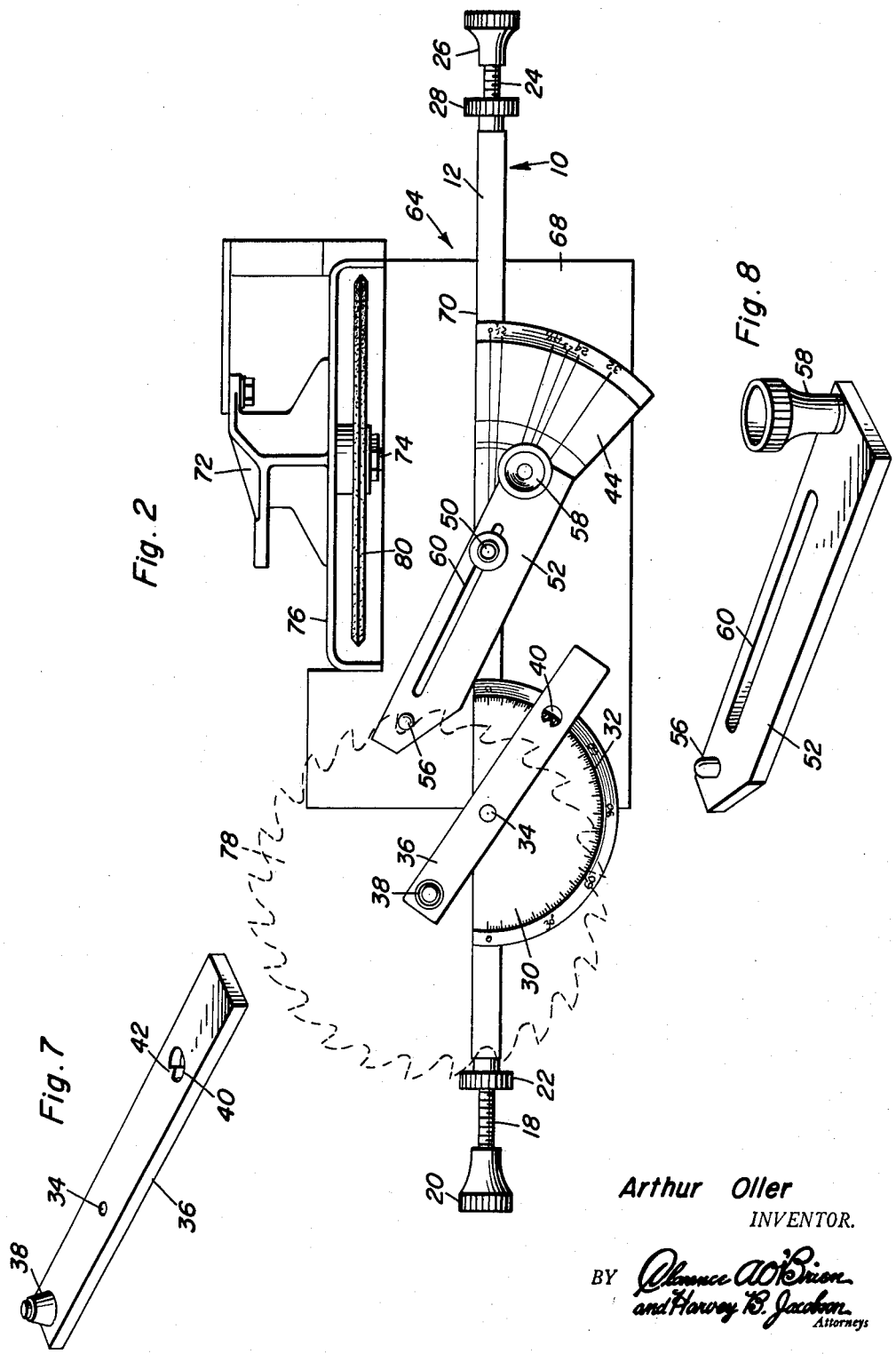
Arthur Oller
INVENTOR.

April 24, 1956     A. OLLER     2,742,799
CIRCULAR SAW GRINDING FIXTURE
Filed Jan. 28, 1955     3 Sheets-Sheet 3
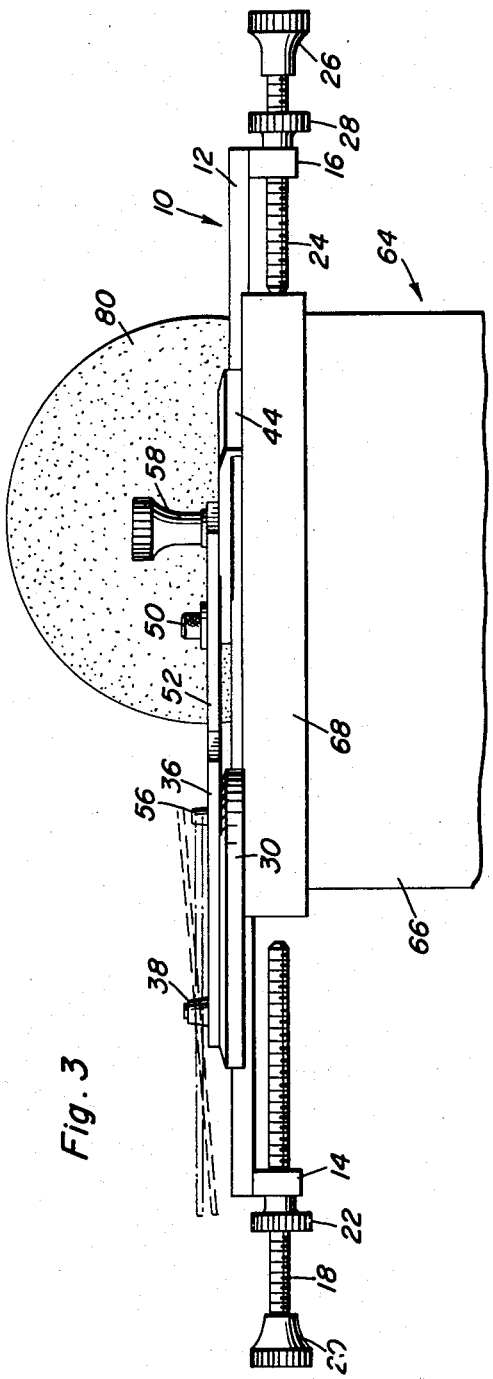
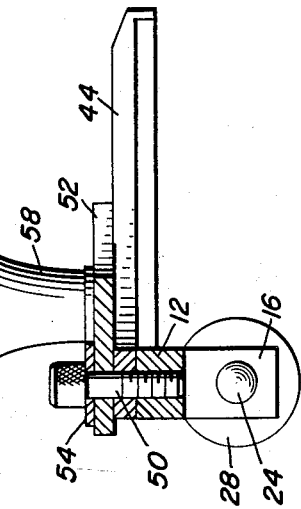
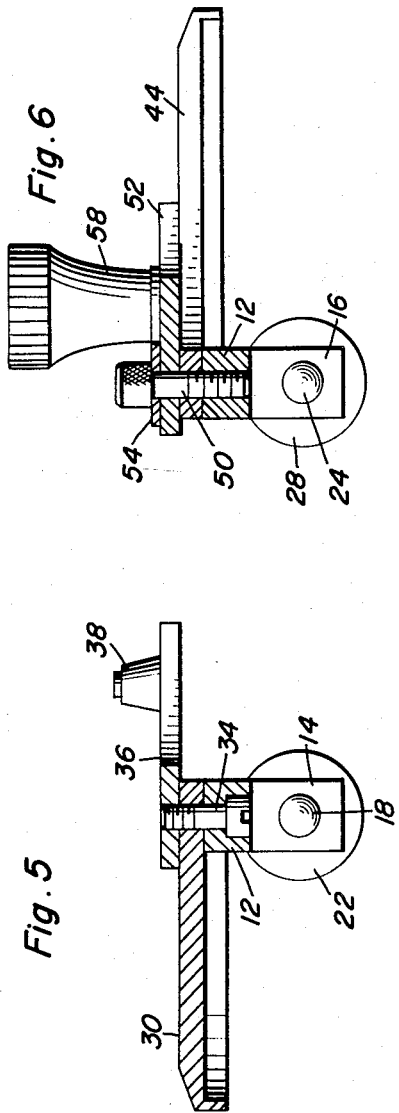
Arthur Oller
INVENTOR.

United States Patent Office 2,742,799
Patented Apr. 24, 1956

2,742,799

CIRCULAR SAW GRINDING FIXTURE

Arthur Oller, San Fernando, Calif., assignor of one-half to Irvin S. Crowell, San Francisco, Calif.

Application January 28, 1955, Serial No. 484,698

4 Claims. (Cl. 76—43)

This invention relates in general to new and useful improvements in grinding devices, and more specifically to an improved circular saw grinding fixture.

There are many persons who wish to grind or sharpen circular saws either for their own purposes or on a small scale, but cannot do so because existing machines are relatively expensive. However, nearly all such persons own or have access to either a bench saw or a sander which includes a tiltable table having a guide slot therein.

It is therefore the primary object of this invention to provide an improved circular saw grinding fixture which is of such a nature whereby it may be quickly and conveniently mounted on a table of either a bench saw or a sander to utilize both the arbor and the adjusting mechanisms of the tool.

Another object of this invention is to provide an improved circular saw grinding fixture which is so constructed whereby a saw may be properly positioned with respect to a grinding wheel and reciprocated back and forth relative to the grinding wheel through the use of the conventional guide slot in a table of a bench saw or sander so that the fixture may be utilized in the grinding operation of a circular saw utilizing a conventional-type tool.

Still another object of this invention is to provide an improved circular saw grinding fixture intended for mounting upon bench saws or sanders, the fixture being relatively simple in construction including very few parts so as to be of such a nature whereby the manufacture thereof is economically feasible.

A further object of this invention is to provide an improved circular saw grinding fixture which may be quickly and easily set through the use of simple instructions so that little knowledge is required to operate the same.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the circular saw grinding fixture which is the subject of this invention and shows the general details thereof;

Figure 2 is a top plan view on a smaller scale of the grinding fixture of Figure 1 and shows the same mounted on a conventional type of tool for operation in conjunction therewith, the tool being shown in light lines and a saw blade to be sharpened being shown in broken lines;

Figure 3 is a side elevational view of the fixture of Figure 1 and shows the same mounted on the tool in Figure 2, only a fragmentary portion of the tool being shown and the saw blade to be sharpened being shown in dotted and broken lines, the dotted line position of the saw illustrating the manner in which it is rotated for selectively positioning a tool to be sharpened;

Figure 4 is an end elevational view of the tool showing the table on which it is mounted being tilted so as to grind a rake into the teeth of the circular saw being sharpened, the saw being shown by broken lines;

Figure 5 is an enlarged transverse vertical sectional view taken substantially upon the plane indicated by the section line 5—5 of Figure 1 and shows the details of mounting for a first arm of the fixture which is utilized for positioning the center of a saw blade to be sharpened;

Figure 6 is an enlarged transverse vertical sectional view taken substantially upon the plane indicated by the section line 6—6 of Figure 1 and shows the details of the mounting of a second arm which is intended to be utilized in the positioning of individual teeth of a saw blade to be sharpened;

Figure 7 is a perspective view of the first arm per se and shows the general details thereof; and Figure 8 is a perspective view of the second arm per se and shows the general details thereof.

Referring to the drawings in detail, it will be seen that there is illustrated the circular saw grinding fixture which is the subject of this invention, the fixture being referred to in general by the reference numeral 10. The fixture 10 includes an elongated bar 12 which is generally rectangular in cross-section and which is of a width to be received in a guide slot of the table of a conventional-type tool such as a bench saw or a sander.

Carried at opposite ends of the bar 12 in depending relation are blocks 14 and 16. The block 14 has adjustably threadedly engaged therein and passing therethrough a stop screw 18 which is disposed in parallel relation with the axis of the bar 12. The stop screw 18 is provided at its outer end with a knob 20 to facilitate the positioning thereof. Threadedly engaged on the stop screw 18 is a locking nut 22.

Threadedly engaged in the block 16 and passing therethrough is a second stop screw 24. The stop screw 24 is provided at its outer end with a handle 26 to facilitate the positioning thereof. Carried by the stop screw 24 is a lock nut 28 for engaging the block 16 and retaining the stop screw 24 in an adjusted position.

Fastened to the bar 12 on the side thereof and adjacent the block 14 end thereof is a plate 30 which is generally semicircular in outline. An outer portion of the plate 30 is provided with a suitable dial portion 32 which is graduated in degrees.

Extending upwardly through the center for the radius of the periphery of the plate 30 is an adjustable fastener 34. The adjustable fastener 34 pivotaly secures to the bar 12 and the plate 30 a first arm 36, the first arm 36 pivoting about the axis of the fastener 34. Carried by one end of the first arm 34 is a pin 38 which is intended to be received in the center of a circular saw blade to be sharpened, the pin 38 facilitating the centering of circular saw blades having various diameter arbor openings therein. The pin 38 may be provided with suitable adapters (not shown) to accommodate various types of blades. In order that the first arm 36 may be properly positioned, there is provided a sight opening 40 therein alignable with the dial 32. The sight opening has a built-in pointer 42.

Fastened to the side of the bar 12 in spaced relation with respect to the plate 30 is a plate 44. The plate 44 is quadrant in outline and has a dial portion 46. The dial portion 46 is also graduated in degrees and includes a plurality of graduation marks 48, the graduation marks extending radially from the center for the radius of the periphery of the plate 44 and being those most commonly used in conjunction with the fixture 10.

Passing down through the center of the plate 44 and adjustably threaded in the bar 12, as is best illustrated in Figure 6, is a clamping fastener 50. The clamping fastener 50 forms a pivot for a second arm 52 which is mounted thereon. The clamping fastener 52 has a washer 54 which overlies the second arm 52 to facilitate the clamping thereof against the plate 44.

The outer end of the second arm 52 is provided with a relatively small pin 56 which projects upwardly therefrom. The pin 56 is intended to be positioned in between teeth of a circular saw blade to be sharpened in order to properly align the teeth. The opposite end of the second bar 52 is provided with a handle 58 for manipulating the fixture 10 in a saw grinding operation.

The second arm 52 must not only be angularly adjusted, but also adjusted to accommodate for saw blades of different diameters. Accordingly, there is provided in the arm 52 an elongated, longitudinally extending slot 60, the slot 60 receiving the fastener 50 so that the fastener 50 may be utilized to retain the second arm 52 in both an angularly and longitudinally adjusted position. In order to properly longitudinally adjust the second arm 52, the plate 44 is provided with suitable arcuate graduations 62 indicating the distances from the fastener 50, the axis of which is utilized as a center from which the arcuate graduation 62 are struck.

Referring now to Figures 2, 3 and 4 in particular, it will be seen that there is illustrated a power tool which is referred to in general by the reference numeral 64. The power tool 64 may be in the form of either a bench saw or a sander. However, inasmuch as the particular nature of the power tool 64 is not important, but only the components thereof which are described hereinafter, the power tool 64 will not be specifically identified.

The power tool 64 includes a base 66. Pivotally mounted on the base 66 for respective tilting is a table 68. The table 68 is provided with an elongated guide slot 70 for receiving a work guide member (not shown).

Carried by the base 66 is a bearing housing 72. The bearing housing 72 has rotatably carried thereby an arbor 74 which may carry either a sanding disc or a circular saw blade as the case may be. If desired, the table 68 may be provided with a suitable guard 76.

When it is desired to utilize the fixture 10 for the sharpening of a circular saw blade, such as the saw blade 78, the bar 12 is positioned in the guide slot 70 for sliding movement along the table 68 parallel to the general plane of an abrading wheel which may be carried by the arbor 74.

The original abrading wheel of the tool 64, whether it is a sanding disc or a saw blade, is removed and replaced by a relatively thin grinding wheel 80 which is shaped to fit the contour of the particular teeth which are to be sharpened.

After the bar 12 has been positioned on the table 68, the relative movement thereof is limited by setting the stop screws 18 and 24. The setting of the stop screw 18 is particularly important inasmuch as it limits the grinding operation on the saw blade 78.

The fixture 10 will be provided with a suitable table for indicating the setting of the arms 36 and 52 in order to properly sharpen the various types of saw blades. The arm 36 will be first set utilizing the dial 32 and then the arm 52 will be set utilizing the dial 46 and the graduations 62.

After the arms 36 and 54 have been set, the saw blade 78 to be sharpened is centered on the pin 38. Then, it is tilted and positioned relative to the arm 52 so that the pin 56 is positioned between a pair of adjacent teeth of the saw blade 78. The saw blade 78 having thus been positioned, the fixture 10, together with the saw blade 78, is moved to the right whereby the saw blade 78 moves into engagement with the grinding wheel 80 and a first tooth is sharpened. The penetration of the grinding wheel 80 into the saw blade proper will be limited by the engagement of the stop screw 18 with an edge of the table 68. A first tooth having thus been sharpened, the saw blade 78 is tilted, as is best illustrated in Figure 3, and rotated so that the pin 56 now becomes positioned between the next pair of teeth. The saw blade 78 is again moved into engagement with the grinding wheel 80 so as to sharpen the next tooth. This operation is continued until such time as all of the teeth of the saw blade 78 have been sharpened.

As is best illustrated in Figure 4, the table 68 may be tilted with respect to the grinding wheel 80. This permits the grinding of the face of the teeth of the saw blade 78 at a desired angle to produce the desired rake. Inasmuch as the rake of adjacent teeth are generally opposite, all of one set of teeth may be first ground to the desired rake and then the angle of the table 68 reversed so as to properly grind a rake on the other set of teeth.

In many instances it may be necessary to true the saw blade 78 before the individual teeth thereof are re-formed and sharpened. In order to accomplish this, the arm 52 is moved to an out-of-the-way position and the bar 12 is rigidly clamped on the table 68 through the use of the stop screws 18 and 24 which also function as clamping screws. When the arm 36 is properly positioned, the saw blade 78 may be manually rotated with respect to the pin 38 so that as it is rotated it will be ground into a perfect circle by the grinding wheel 80. Once the saw blade 78 has been ground to a perfect circle, it may then be re-formed and sharpened in the manner described above.

From the foregoing, it will be readily apparent that there has been devised a circular saw grinding fixture which may be easily and quickly attached to existing bench saws and sanders with a minimum of effort and no alteration whatsoever to the main structures of these types of tools so that through the addition of the fixture, which is the subject of this invention, a tool owned by many home craftsmen may be readily converted into a circular saw grinding machine.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a bench saw of the type including a table having a guide slot therein, an arbor mounted beneath said table and a grinding wheel on said arbor, said table having a slit therethrough, said grinding wheel projecting through said slit above said table, a circular saw grinding fixture comprising an elongated bar slidably mounted in said guide slot for movement therein, a first arm pivotally carried by said bar, a saw mounting pin on said first arm for retaining a saw blade in parallel overlying relation relative to said table, a second arm pivotally mounted on said bar adjacent said first arm, a saw tooth positioning pin on said second arm, and stop means carried by opposite ends of said bar for engaging edges of said table to limit movement of said fixture relative to said grinding wheel during a saw sharpening operation.

2. In combination with a bench saw of the type including a table having a guide slot therein, an arbor mounted beneath said table and a grinding wheel on said arbor, said table having a slit therethrough, said grinding wheel projecting through said slit above said table, a circular saw grinding fixture comprising an elongated bar slidably mounted in said guide slot for movement therein, a first arm pivotally carried by said bar, a saw mounting pin on said first arm for retaining a saw blade in parallel overlying relation relative to said table, a second arm pivotally mounted on said bar adjacent said first arm, a saw tooth positioning pin on said second arm, and stop means carried by opposite ends of said bar for engaging edges of said table to limit movement of said fixture relative to said grinding wheel during a saw sharpening operation, said bar including two adjacent plates overlying said table, said first and second arms having portions thereof overlying said plates, and dial means on said plates for positioning said first and second arms.

3. In combination with a bench saw of the type including a table having a guide slot therein, an arbor mounted beneath said table and a grinding wheel on said arbor, said table having a slit therethrough, said grinding wheel projecting through said slit above said table, a circular saw grinding fixture comprising an elongated bar slidably mounted in said guide slot for movement therein, a first arm pivotally carried by said bar, a saw mounting pin on said first arm for retaining a saw blade in parallel overlying relation relative to said table, a second arm pivotally mounted on said bar adjacent said first arm, said first and second arms being independent of each other, a saw tooth positioning pin on said second arm, and stop means carried by opposite ends of said bar for engaging edges of said table to limit movement of said fixture relative to said grinding wheel during a saw sharpening operation.

4. In combination with a bench saw of the type including a table having a guide slot therein, an arbor mounted beneath said table and a grinding wheel on said arbor, said table having a slit therethrough, said grinding wheel projecting through said slit above said table, a circular saw grinding fixture comprising an elongated bar slidably mounted in said guide slot for movement therein, a first arm pivotally carried by said bar, a saw mounting pin on said first arm for retaining a saw blade in parallel overlying relation relative to said table, a second arm pivotally mounted on said bar adjacent said first arm, a saw tooth positioning pin on said second arm, and stop means carried by opposite ends of said bar for engaging edges of said table to limit movement of said fixture relative to said grinding wheel during a saw sharpening operation, said grinding wheel and said table being tiltable relative to each other to vary the rake of teeth being sharpened.

References Cited in the file of this patent
UNITED STATES PATENTS

| Number | Name | Date |
| --- | --- | --- |
| 112,838 | Otis | Mar. 21, 1871 |
| 217,850 | Barber | July 29, 1879 |
| 327,609 | Smith | Oct. 6, 1885 |
| 928,332 | Robinson | July 20, 1909 |
| 2,213,413 | Shaw | Sept. 3, 1940 |
| 2,293,231 | Weiland | Aug. 18, 1942 |
| 2,459,233 | Mall | Jan. 18, 1949 |
| 2,605,654 | Holmes | Aug. 5, 1952 |
| 2,646,697 | Phillips et al. | July 28, 1953 |